Patented Aug. 23, 1932

1,872,701

UNITED STATES PATENT OFFICE

HENRY DREYFUS, OF LONDON, ENGLAND

CELLULOSE ESTERS AND THE PROCESS OF MAKING THE SAME

No Drawing. Application filed September 16, 1926, Serial No. 135,999, and in Great Britain March 26, 1926.

This invention relates to the manufacture of new cellulose esters, particularly cellulose acetates.

In the manufacture of cellulose acetate or other cellulose esters, it is customary, after the acetylation or esterification is complete, to subject the resulting product to a secondary or ripening treatment for the purpose of imparting it to the solubility characteristics requisite for the production of solutions suitable for the manufacture of filaments, for example, by the dry spinning or evaporative method, or by any other appropriate method.

The viscosity of the ripened cellulose acetate—as measured for example by comparison of the rate of flow of a 6% solution in pure acetone at a temperature of 60° F. with the rate of flow of pure glycerine under like conditions, the rate of flow of the glycerine being taken as 100—varies to a marked extent in accordance with the manner in which the cellulose esters are prepared. In order to make an accurate comparison of the relative viscosities of different cellulose esters prepared by different methods, it must be understood that the stage at which the ripening is stopped—must be the same for all. The various stages of ripening are shown by the solubility of the cellulose esters in different solvents. In the case of cellulose acetates the solvents include acetone, alcohol, and benzol alcohol.

My earlier U. S. Patents Nos. 1,278,885 and 1,280,975 describe cellulose esters, particularly cellulose acetates, which were the most viscous then known and which can only be produced by the processes described and claimed in these specifications, said cellulose acetates or other esters varying in viscosity from about 20 to 100 or even more, but usually being about 20 to 30 in the case of acetates intended for the production of spinning solutions for use in making filaments of artificial silk.

In my U. S. Patent 1,708,787, I described cellulose acetates which, both before and after ripening in the ordinary way, are of enormously high viscosity, going up to 200, 300 and 400, and even higher.

These products are very valuable as they consist of cellulose acetates in which the original cellulose molecule is much more preserved than in the acetates previously known. While, however, these acetates after the usual ripening or secondary treatment are soluble in solvents such as acetone, alcohol benzol, etc. to form solutions of the requisite concentration for technical use, ranging, for example, from 10% to 20% or 25% or 30% or even greater concentration, the resulting solutions are of very high viscosity.

I have now discovered that if the secondary or ripening treatment is prolonged beyond the usual stage of solubility, for example beyond the stage at which the acetates become soluble in alcohol-benzol mixtures, a gradual diminution in the viscosity can take place, so that products showing a viscosity less than 100, say 50, can be obtained, the cellulose molecule being nevertheless substantially preserved. Although as the ripening proceeds, the solubility in certain solvents or mixtures of solvents diminishes, so increasing the viscosity of its solutions in those solvents, the solubility in other solvents or mixtures of solvents is at the same time substantially increased to such an extent that the viscosity, although it was originally very high, is substantially decreased. Thus, for example, when when mixtures of acetone and water are used as solvent, as the ripening goes on the proportion of water in the solvent composition can be increased, and the result is that the viscosity of the solution diminishes, and, provided that the ripening has not been carried too far, the filaments or threads produced by spinning such solutions of reduced viscosity nevertheless have the increased strength which would be expected in accordance with the high viscosity of the acetate originally produced by acetylation and the preservation of the cellulose molecule. Similar results may be obtained by the use of other solvents or mixtures of solvents which dissolve cellulose acetate at this stage of the ripening process. The strength of the resulting filaments, whether obtained by dry spinning or otherwise, is entirely satisfactory. In fact, it has been found that, notwithstanding the diminution in the viscosity, the filaments obtained by spinning solutions of the resulting cellulose acetates are of substantially increased strength and, indeed much stronger than any filaments that have been produced from other cellulose acetate solutions of similar viscosity, but prepared from primary cellulose acetates of lower viscosity characteristics.

According to my invention, therefore, cellulose esters, particularly cellulose acetates, of a viscosity exceeding about 50, particularly cellulose acetates having a viscosity of over about 100, for instance 150, 200, or 400, are subjected to a secondary or ripening treatment, which is prolonged until a stage is reached at which the resulting products are of relatively much lower viscosity than in the previous stages of the secondary or ripening treatment, and are soluble in different solvents, or in mixtures of solvents in different proportion, from those in which said products were soluble in the previous stages, for example, being soluble in acetone-water mixtures containing a larger proportion of water than the acetone-water mixtures used in previous stages. Initially, the stage at which the ripening is to be stopped is determined in accordance with the strength of the filaments obtained by spinning solutions of the ripened esters and, the ripening operation is afterwards controlled in practice by testing the solubility characteristics of the ripened product, conveniently, in the case of cellulose acetate, by determining its solubility in a mixture of acetone and water. As the ripening proceeds, cellulose acetate becomes soluble in acetone of a greater dilution.

The ripening may be effected by processes described in my U. S. A. Patent No. 1,217,722, which describes in detail processes of further treatment for transforming acetylation products into products having other solubilities.

*Example*

100 parts by weight of cellulose are treated with 900 to 1000 parts by weight of glacial acetic acid, 200 to 250 parts by weight of acetic anhydride, and 3 to 10 parts by weight of sulphuric acid at an initial temperature of 0–5° C., which may be allowed to rise to 10 to 15° C. or even higher towards the close of the acetylation. When the acetylation is complete, the excess of acetylating agent is destroyed by the addition of water and the mixture is allowed to stand at about 20° C., until a product is obtained which is soluble in acetone containing about 3–10% of water or more according to the degree to which the viscosity is to be reduced.

The acetylation solution can also be treated by neutralizing the effect of the condensing agent partially or completely and afterwards conducting the secondary treatment either at ordinary temperature or with heating to accelerate the reaction as described in my said U. S. A. Patent No. 1,217,722.

The cellulose acetate resulting from the ripening or secondary treatment above described can be dissolved in mixtures of acetone and water to form spinning solutions containing from 10% to 20% or 25% of cellulose acetate and capable of being spun into filaments of substantially greater strength than any artificial filaments previously known.

While the invention has been described more particularly with reference to high viscosity acetates such as are described in my U. S. Patent 1,708,787, it is to be understood that it is applicable generally to cellulose esters, and particularly cellulose acetates, of very high viscosity as hereinbefore described.

The invention, moreover, is not limited to the particular procedure set forth in the example, for example the ripening may be effected without the addition of water or neutralizing agents, or after the addition of substances which act similarly to water or by any other process.

The new cellulose acetates or other esters obtained in accordance with this invention are applicable for the production of artificial filaments or threads, and woven, knitted and other textile fabrics containing such artificial filaments or threads.

What I claim and desire to secure by Letters Patent is:—

1. Process for the production of cellulose esters, comprising esterifying cellulose and ripening the product until it exhibits a minimum viscosity in solution in an anhydrous water miscible solvent, substantial degradation of the cellulose molecule being avoided so that the said minimum viscosity is high, and thereafter continuing the ripening until a product is obtained having in a solution of equal concentration in the said solvent diluted with water a lower viscosity than the minimum viscosity in the anhydrous solvent.

2. Process for the production of cellulose acetates, comprising acetylating cellulose and ripening the product until it exhibits a minimum viscosity in solution in anhydrous acetone, substantial degradation of the cellulose molecule being avoided so that the said minimum viscosity is high, and thereafter continuing the ripening until a product is obtained having in a solution of equal concentration in aqueous acetone a lower viscosity than the minimum viscosity in anhydrous acetone.

3. Process for the production of cellulose acetates, comprising acetylating cellulose and ripening the product until it exhibits a minimum viscosity in solution in anhydrous acetone, substantial degradation of the cellulose molecule being avoided so that said viscosity is above 50, and thereafter continuing the ripening until a product is obtained having in a solution of equal concentration in aqueous acetone a lower viscosity than the minimum viscosity in anhydrous acetone.

4. Process for the production of cellulose acetates, comprising acetylating cellulose and ripening the product until it exhibits a minimum viscosity in solution in anhydrous acetone, substantial degradation of the cellulose molecule being avoided so that the said minimum viscosity is high, and thereafter continuing the ripening until a product is obtained having in a solution of equal concentration in acetone containing 3 to 10% of water a lower viscosity than the minimum viscosity in anhydrous acetone.

5. Process for the production of cellulose acetates, comprising acetylating cellulose and ripening the product until it exhibits a minimum viscosity in solution in anhydrous acetone, substantial degradation of the cellulose molecule being avoided so that said viscosity is above 50, and thereafter continuing the ripening until a product is obtained having in a solution of equal concentration in acetone containing 3 to 10% of water a lower viscosity than the minimum viscosity in anhydrous acetone.

6. A cellulose ester having a high viscosity in solution in an anhydrous water miscible solvent and a lower viscosity in a solution of equal concentration in said solvent diluted with water.

7. Cellulose acetate having a high viscosity in solution in anhydrous acetone and a lower viscosity in a solution of equal concentration in aqueous acetone.

8. Cellulose acetate having a high viscosity in solution in anhydrous acetone and a lower viscosity in a solution of equal concentration in acetone containing 3 to 10% of water.

In testimony whereof I have hereunto subscribed my name.

HENRY DREYFUS.